July 7, 1959
J. G. LINVILL
2,894,217
COMPUTING CIRCUITS
Filed March 3, 1955
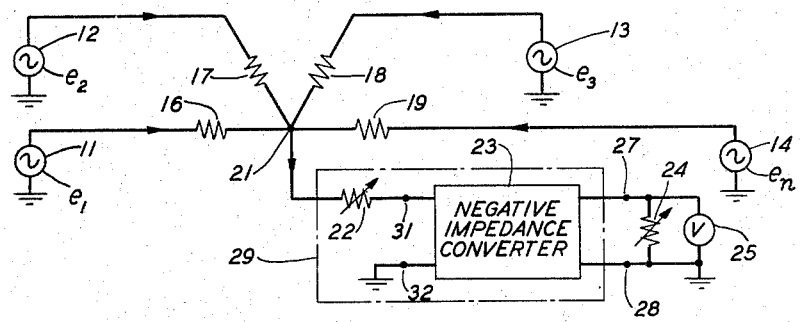
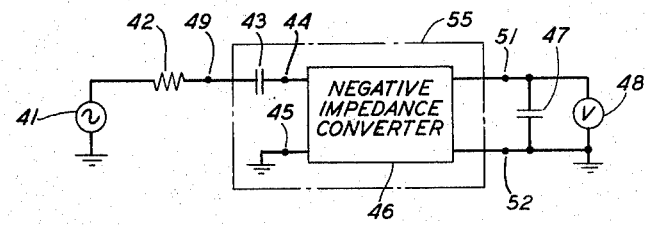
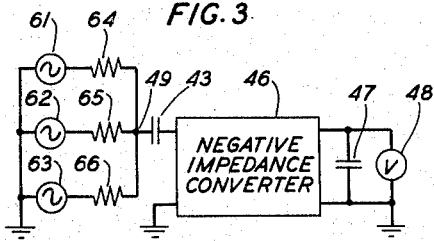 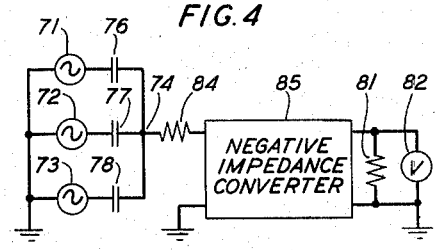
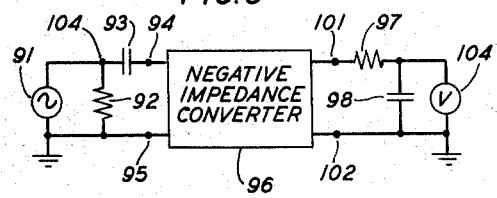 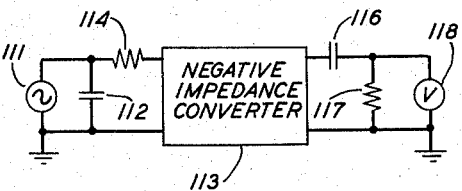
INVENTOR
J. G. LINVILL
BY Alan C. Rose
ATTORNEY United States Patent Office 2,894,217
Patented July 7, 1959

2,894,217

COMPUTING CIRCUITS

John G. Linvill, Whippany, N.J., assignor to Bell Telephone Laboratories, Incorporated, New York, N.Y., a corporation of New York Application March 3, 1955, Serial No. 491,898

7 Claims. (Cl. 333—19)

This invention relates to computing circuits and has for its principal objects the improvement of the precision of electrical computation and the certainty of the indication of the result of such computation.

In the arts of measurement, indication and control by electronic techniques, it frequently becomes necessary to add together a plurality of quantities which appear simultaneously, to add together successive increments of a single quantity, to determine the time rate of change of such a quantity, and the like. The first of these operations is known as summing or adding, the second is known as integration, and the third is known as differentiation.

A well known circuit arrangement for adding together a number of unrelated quantities is to provide a plurality of individual generators the output of each of which is proportional to one of these quantities, to pass each output through an individual weighting resistor to a common point, and then to apply the resulting signal, as it appears at this common point, to a common adding resistor. The voltage appearing across the latter is approximately proportional to the desired sum. It may then be applied to an indicator or other utilization device, after such amplification as may be necessary.

A well known electronic integrator of the voltage output of a source comprises a resistor in series with a condenser. The voltage which appears across the condenser is approximately proportional to the time integral of the source voltage variations. It may be applied to an appropriate indicator after such amplification as may be necessary.

Similarly, a well known electronic differentiator of the voltage output of a source comprises a condenser in series with a resistor. The voltage which appears across the resistor is approximately proportional to the time derivative of the source voltage. As in the cases mentioned above, it may be applied to an appropriate indicator after such amplification as may be necessary.

In the construction of such an adder or such an integrator or differentiator, the designer is faced with the necessity of effecting a compromise between incompatible requirements. In order that the adding circuit shall carry out its intended operation correctly, the current of each source must be limited solely by its own weighting resistor; i.e., the common adding resistor must be of negligible magnitude as compared with the individual weighting resistors; ideally, its resistance should be zero. But evidently, the voltage which appears across a resistor of zero or near zero magnitude is itself of zero or near zero magnitude. Consequently, to obtain a positive indication of the sum, a large amount of amplification must be interposed with all that this entails of complexity, shielding against noise, and the like.

The same dilemma is presented in the case of conventional integration and differentiation circuits which both include a series resistor and condenser. In the case of an integrator, the condenser is the output element, while in a differentiator the resistor is the output element. In order that the voltage appearing across the output element shall be a true integral or derivative of the source voltage, no back voltage should be developed across the output element. In other words, the impedance of the condenser or resistor across which the output voltage is developed must be negligible as compared with the impedance of the other element in the series circuit. In the case of the integrator, for example, whatever magnitudes may be chosen for these elements, a low frequency may always be found at which this condition fails, and at higher frequencies the voltage appearing across the condenser is so small as to require an excessive amount of amplification.

Accordingly, a specific object of the present invention is to avoid the distortion produced in computing circuits by the back voltage developed across the output element of the circuit.

In accordance with the present invention, computing circuits are provided in which the impedance across the output element of the circuit as seen by the source appears to be equal to zero, and distortion due to back voltage developed across this element is therefore eliminated. At the same time, a strong output signal is furnished which normally needs no further amplification.

The invention attains its objects and secures these results by the employment of a negative impedance converter at an appropriate point of the circuit, a positive load or output impedance from which the required indication is obtained, and another positive impedance element whose function is to annul the negative impedance presented by the converter and its load, taken together. Thus, in particular, a negative impedance converter whose impedance conversion factor is $-k$ has connected to its output terminals a positive impedance element of magnitude $Z$. The impedance seen looking into the input terminals of the converter is then $-kZ$. A positive impedance element of magnitude $kZ$ is connected in series with the input terminals of the converter. At this point, then, the impedance is identically zero. In computing circuits such as are mentioned above, when the signal source or sources are appropriately connected to this zero impedance point, the signals are isolated from variations of the indicated output voltage developed across the impedance element $Z$ in the output circuit of the negative impedance converter.

Therefore, in accordance with one aspect of the invention, a summing network may be constructed by applying all the currents, derived through individual weighting resistors from the independent sources whose voltages are to be summed, to this point of zero impedance. The fact that the impedance is here zero means that the current of each source is governed exclusively by its weighting resistor so that the currents flowing into this zero impedance furnish a true measure of the sum of the source voltages. At the same time, the current flowing into the zero impedance, which is substantial, reappears as a current of comparable magnitude flowing in the load impedance. This load current, or its voltage, may now be determined or indicated in any desired fashion and represents a powerful and precise measure of the desired sum.

Similarly, a precise and powerful integrator or differentiator may be constructed by applying the signals from the source to be integrated or differentiated to the zero impedance point. In the case of the integrator, the difference is only that the load on the converter and the annulling impedance in series with it are reactive instead of resistive. The differentiation circuit differs from the summing circuit discussed in the preceding paragraph only in the use of individual input condensers instead of the weighting resistors.

In computing circuits, the available signal sources often have a high internal impedance, or are matched to a specific load circuit. Under these conditions, the addition of a computing circuit which draws substantial amounts of power may greatly reduce the output voltage or cause an undesirable impedance mismatch.

Accordingly, another object of the present invention is to substantially eliminate the power output required from a signal voltage source to a computing circuit. This is accomplished in integration and differentiation circuits by the use of a complex load impedance including a resistor and a condenser connected to the output terminals of a negative impedance converter. Because of the properties of negative impedance converters, a complex negative impedance is presented by the converter at its input terminals. In the case of an integrator, in which the output element is a condenser, the signal voltage source is connected in series with another condenser to the second pair of terminals, and another resistor is connected in parallel with the signal source. When the condenser and the resistor associated with the signal source are of the proper value to annul the negative impedance presented by the converter at its input terminals, little or no current is drawn from the voltage source. The same result may be secured in a similar manner in the case of differentiation circuits.

Other objects and various advantages and features of the invention will become apparent by reference to the following description, taken in connection with the appended claims and the accompanying drawings forming a part thereof:

In the drawings:

Fig. 1 shows a summing circuit in accordance with one invention;

Fig. 2 is an integrating, or time summation circuit;

Fig. 3 shows a circuit for adding together the integrals of several input signals;

Fig. 4 is a combined differentiating and summing circuit; and

Figs. 5 and 6 illustrate improved integrating and differentiating circuits, respectively, in which no power is drawn from the signal source.

Referring more particularly to the drawings, Fig. 1 shows, by way of example and for purposes of illustration, a summing circuit. In the circuit of Fig. 1, the voltage sources 11 through 14 represent quantities which are to be added together. Output signals from the signal sources 11 through 14 are connected through the weighting resistors 16 through 19, respectively, to a common summing point 21. The summing point 21 is connected by resistance 22 to the input of the negative impedance converter 23. A load resistance 24 is connected to the output of the converter 23, and the voltage developed across the load resistor may be applied to any desired utilization circuit such as a vacuum tube voltmeter 25.

In considering the mode of operation of the circuit of Fig. 1, it will be assumed initially that the point 21 is directly connected to the point 27. Under the foregoing assumption, the elements 22 and 23 in the dashed line box 29 would be omitted from the circuit. The output voltage across the load resistor 24 is developed at point 27. Currents developed by the voltage sources 11 through 14 and the associated weighting resistors 16 through 19, respectively, are added, or summed, at point 21. With point 21 connected to point 27, the net current at point 21 would be applied to load resistor 24. This current would develop a voltage across resistor 24 which would be read by the voltmeter 25. As mentioned above, however, the voltage appearing across load resistor 24 would not be a true indication of the sum of the voltage sources 11 through 14. For example, the current from source 11 and resistor 16 appearing at point 21 when the voltage of the source 11 is held constant would vary in accordance with the voltage at point 27.

In the following description it will be shown how the addition of the negative impedance converter 23 and the resistor 22 maintains the point 21 at a fixed potential, notwithstanding variations in output voltage across load resistor 24. Before considering the complete circuit of Fig. 1 in detail, however, the properties of negative impedance converters will be reviewed briefly. First, when a positive impedance element is connected to one of its two pairs of terminals, the impedance seen at its second pair of terminals is equal to the magnitude of the positive impedance element multiplied by the impedance conversion factor $(-k)$ of the converter. Alternatively, when a positive impedance element is connected to the second pair of terminals of the converter, the impedance seen at the first pair of terminals is equal to the magnitude of the positive impedance element multiplied by the factor $-1/k$. Secondly, signal currents applied to one pair of terminals of the converter appear as proportional currents at the other pair of terminals. Three articles which disclose specific negative impedance converters and various circuits in which they are used are: "A Negative Impedance Repeater" by J. L. Merrill, Jr., Transactions of the American Institute of Electrical Engineers, volume 70, part 1, pages 49 through 54, 1951; "Theory of the Negative Impedance Converter" by J. L. Merrill, Jr., Bell System Technical Journal, volume 30, pages 88 through 109, January 1951; and "RC Active Filters" by J. G. Linvill, Proceedings of the I.R.E., volume 42, pages 555 through 564, March 1954.

Referring again to Fig. 1, the resistor 24 and the voltmeter 25 are connected to one pair of terminals 27, 28 of the converter 23. The impedance of these two elements is designated "R." Accordingly, the impedance of the converter 23 as seen from terminals 31, 32 is equal to $-kR$, where $-k$ is the impedance conversion factor of the converter 23. The positive impedance element 22, which has a value of $kR$, is connected to terminal 31 of the converter 23 to annul the negative impedance $-kR$ presented by the converter at the terminals 31, 32. The input impedance of the resistor 22 and the converter 23 seen from point 21 is now equal to zero, and the point 21 remains at all times at ground potential. The current from each of the voltage sources 11 through 14 is now dependent only on the magnitude of the corresponding weighting resistors 16 through 19, respectively, and the instantaneous value of the voltage source itself. Currents proportional to those applied through resistor 22 to terminal 31 of the converter 23 appear at output terminal 27 of the converter, and are applied to load resistor 24. A voltage proportional to the sum of the voltages at sources 11 through 14 appears at voltmeter 25.

Unlike the prior art circuits of the type which develop the output voltage across a load resistor connected directly to the summing point, there is no interaction between the voltage sources 11 through 13 of Fig. 1, and no opposing voltage developed at the summing point 21 to distort the output signal. In addition, the voltage developed at terminal 27 may be adjusted to any convenient output level by varying the impedance 24. The annulling impedance 22 is preferably varied concurrently so that the voltage at point 21 remains equal to zero. The voltage developed across load resistor 24 may thus be of the same order of magnitude or substantially greater than that of any of the voltage sources 11 through 13. Thus, the problem of exceedingly low level signals which is present in summing networks of the prior art is also overcome.

In Fig. 2, the principles described above with respect to Fig. 1 are applied to an integrating circuit. In Fig. 2, signals from the voltage source 41 are applied to the series circuit including the resistance 42, the condenser 43 and one of the input terminals 44, 45 of the negative impedance converter 46. The condenser 47 and the voltmeter 48 are connected in parallel across the output terminals 51, 52 of the converter 46.

If the box 55, including the converter 46 and the condenser 43 were removed, and point 49 were connected directly to terminal 51, the circuit including resistance 42 and condenser 47 would be recognized as a conventional integration circuit. However, the conventional integration circuit including a resistor and condenser is imperfect. Specifically, as the condenser becomes charged, the difference in potential across the resistor is less than it should ideally be, and the current is reduced to a lower value than it should have for true integration. If the potential at the upper point of the condenser could be held constant, however, this error would be avoided. This is much the same problem which was discussed above with respect to the summing point 21 of Fig. 1. The solution suggested in connection with Fig. 1 of inserting a negative impedance converter and an associated network is also applicable to Fig. 2. Thus, in Fig. 2 the impedance connected to terminals 51 and 52 of the converter 46 is made up of the condenser 47 in parallel with the voltmeter 48. If the impedance connected to terminals 51 and 52 is designated "Z," the impedance presented by the converter at terminals 44 and 45 is equal to $-kZ$. The condenser 43 introduces a positive impedance equal to $kZ$, and thus annuls the negative impedance observed at input terminals 44 and 45. The impedance observed at point 49 is therefore equal to zero, and the voltage at point 46 remains constant at ground potential. The increments of current supplied to the negative impedance converter 46 are now truly proportional to the magnitude of the instantaneous voltage of the source 41. Similarly, the current output at terminal 51 of the negative impedance converter 46 is proportional to the magnitude of the voltage source 41, and the voltage developed across the condenser 47 is a true representation of the integral of the voltage of the signal source 41.

Fig. 3 is a circuit in which the integrals of several different signals are summed. The signal sources 61, 62 and 63 are connected in series with their respective weighting resistors 64, 65 and 66. The remainder of the circuit elements, including condenser 43, converter 46, condenser 47 and voltmeter 48, correspond to the components shown in Fig. 2 which bear the same numerals. The point 49 is held at ground potential. This effectively isolates the signal sources 61 through 63 from each other. At the same time, it performs the function disclosed in connection with Fig. 2 of isolating each of the signal sources from the back voltage of the condenser across which the output voltage is developed.

Fig. 4 shows a circuit in which a plurality of signal sources are differentiated and summed. In Fig. 4, the signal sources 71, 72 and 73 are applied to a constant potential point 74 through their respective condensers 76, 77 and 78. The output voltage across the load resistor 81 is determined by the voltmeter 82. As in the circuits of Figs. 1 through 3, a negative impedance is presented by the converter 85 at its left-hand or input pair of terminals. The annulling resistor 84 is connected between the point 74 and one of the input terminals of the negative impedance converter 85. The resistor 84 is of the proper magnitude to precisely annul the impedance of the converter 85 which has load resistor 81 and the voltmeter 82 connected to its output pair of terminals. Accordingly, point 74 remains at ground potential, and the input impedance of the resistor 84 and the converter 85 appears to be zero.

In a conventional differentiating circuit, signals are applied to the series combination of a condenser and a resistor, and the output voltage is picked off across the resistor. The back voltage developed across the resistor introduces errors of the type discussed above with respect to the summing resistor in circuits of the type shown in Fig. 1. In the circuit of Fig. 4, this type of error is again avoided by holding the point 74 at ground potential. In addition to avoiding errors of the type mentioned above, this has the collateral effect of isolating the signal sources 71 through 73 from each other.

The circuits of Fig. 5 and Fig. 6 are integrating and differentiating circuits respectively, in which substantially no power is drawn from the signal source. In Fig. 5, the signal source 91 is applied across the resistor 92. One terminal of the resistor 92 is connected through the condenser 93 to one of the input terminals 94 of the negative impedance converter 96. The other input terminal 95 of the converter 96 is connected to the other terminal of the resistor 92. The resistor 97 and the condenser 98 are connected in series to the output terminals 101 and 102 of the converter 96. A signal proportional to the integral of the voltage of the signal source 91 is obtained at the voltmeter 104. The load impedance connected to terminals 101 and 102 of the converter 96 is complex, and the impedance may be expressed as follows:

$$Z = R + jX$$

where R is the resistive component and X is the reactive component of the impedance Z. The impedance presented by the converter 96 at terminals 94 and 95 is equal to $-k(R+jX)$. The condenser 93 has a capacitive reactance equal to $kX$, and thus annuls the imaginary term in the input impedance presented by the converter 96 at terminals 94 and 95. Accordingly, the impedance seen at point 104 is equal to $-kR$. The value of the resistor 92 is selected to be equal to $kR$. Accordingly, the current flowing upwardly in resistor 92 is equal in magnitude to that flowing to the right from point 104. Therefore, because the sum of currents flowing into any given junction point in an electrical network must be equal to zero, no current can be supplied from the signal source 91. The negative impedance converter 96 has therefore served two purposes in the circuit of Fig. 5. Its use in combination with the capacitance 93 has avoided distortion which would otherwise result from charge build-up on the condenser 98. In addition, the use of the converter 96 in combination with the shunt resistor 92 avoids the necessity of drawing power from the signal source 91.

In the circuit of Fig. 6, a differentiator is shown which is analogous to the integration circuit of Fig. 5. In Fig. 6, the signal source 111 is connected in parallel with the condenser 112. The input terminals of the converter 113 are connected in series with the condenser 112 and the resistor 114. The output terminals of the converter 113 are connected in series with the condenser 116 and the resistor 117. The voltmeter 118 is connected across the resistor 117 to display the differential of the signal voltage of source 111. As mentioned hereinabove, differentiation circuits of the resistor-condenser type are subject to inaccuracies because of the back voltage developed across the resistance. In Fig. 6, this is avoided by the use of the resistor 114, which annuls the resistive component of the impedance connected to the output terminals of the converter 113. The condenser 112 has a capacitive reactance equal to the negative capacitive reactance seen at the left-hand pair of terminals of the converter 113. Accordingly, as in the circuit of Fig. 5, no current is drawn from the signal source.

It is to be understood that the above-described arrangements are illustrative of the application of the principles of the invention. Numerous other arrangements may be devised by those skilled in the art without departing from the spirit and scope of the invention.

Attention is directed to two related patent applications of J. G. Linvill which were filed on March 3, 1955, concurrently with the present application. These applications are Serial No. 491,896, entitled "Branching Arrangement," now Patent 2,757,342, granted July 31, 1956, and Serial No. 491,897, entitled "Branching Circuit," now Patent 2,777,115, granted January 8, 1957.

What is claimed is:

1. In combination, a negative impedance converter having first and second pairs of terminals and a preassigned impedance conversion ratio, output circuit means connected across said first pair of terminals including a load impedance and utilization means responsive to the voltage developed across said load impedance, said output circuit means having a capacitive reactance, a source of signals, an annulling impedance substantially equal to the product of the impedance of said load impedance and said preassigned conversion ratio, and circuit means for connecting said second pair of terminals, said source of signals, and said annulling impedance in series.

2. In combination, a negative impedance converter having first and second pairs of terminals and a preassigned impedance conversion ratio, output circuit means connected across said first pair of terminals including a load impedance and means for utilizing the voltage developed across said load impedance, a source of signals, control input impedance means connected directly to said source of signals for controlling the current flow from said source of signals, an annulling input impedance means substantially equal to the product of the impedance of said load impedance and said preassigned conversion ratio, one of said input impedance means being a capacitor, and circuit means for connecting said second pair of terminals, said source of signals, and said annulling impedance in series.

3. A combination as defined in claim 2 wherein said current controlling impedance means is in series with said source of signals.

4. A combination as defined in claim 2 wherein said current controlling impedance means is in parallel with said source of signals.

5. An integration circuit comprising a negative impedance converter, an integrating capacitance connected to the output terminals of said converter, utilization means responsive to the voltage developed across said capacitance, capacitive means connected to the input terminals of said converter for annulling the negative capacitive reactance presented by said converter at said input terminals, and a signal source and a resistance connected in series with said capacitive means.

6. A combination as defined in claim 5 wherein a plurality of additional signal sources and associated series weighting resistances are connected in parallel with said signal source and resistance.

7. In a summing circuit, a negative impedance converter having first and second pairs of terminals and a preassigned impedance conversion ratio, circuit means connected across said first pair of terminals including a capacitive load impedance element and means for measuring the voltage developed across said load impedance element, said circuit means having a preassigned total impedance, an annulling impedance element substantially equal to the product of said preassigned total impedance and said preassigned conversion ratio, means providing input electrical signals, and circuit means for connecting said signal providing means and said annulling impedance element to said second pair of terminals.

References Cited in the file of this patent

UNITED STATES PATENTS

| | | |
|---|---|---|
| 2,730,680 | Bangert | Jan. 10, 1956 |
| 2,777,115 | Linvill | Jan. 8, 1957 |